United States Patent [19]

Ma et al.

[11] Patent Number: 4,998,111

[45] Date of Patent: Mar. 5, 1991

[54] CPS TRANSFORM CORRELATION RECEIVER AND METHOD

[75] Inventors: Stephen C. Ma, Mesa; Isaac N. Durboraw, III, Scottsdale, both of Ariz.

[73] Assignee: Motorola, Inc., Schaumburg, Ill.

[21] Appl. No.: 441,670

[22] Filed: Nov. 27, 1989

[51] Int. Cl.⁵ .............................................. H04B 7/216
[52] U.S. Cl. ................................................... 342/352
[58] Field of Search ....................................... 342/352

[56] References Cited

U.S. PATENT DOCUMENTS

| | | | |
|---|---|---|---|
| 4,601,005 | 7/1986 | Kilvington | 364/602 |
| 4,701,934 | 10/1987 | Jasper | 342/386 X |
| 4,785,463 | 11/1988 | Janc et al. | 342/357 X |
| 4,797,677 | 1/1989 | McDoran et al. | 342/352 |

Primary Examiner—Gilberto Barron, Jr.
Attorney, Agent, or Firm—Jordan C. Powell

[57] ABSTRACT

A method for rapid acquisition of multiple GPS signals builds upon fast Fourier transformation of input GPS signals to simultaneously track multiple satellites and derive psuedorange measurements that are suitable for navigation solution. The method utilizes 2M samples of the reference signal with N samples of the signal set from the satellites (one millisecond of actual data) to directly compute the fractional psuedorange values for four (4) or more satellites. The FFT process is incorporated with a process to determine an integer psuedorange. The integer psuedorange is then combined with a fractional psuedorange to define the GPS navigation solution.

9 Claims, 1 Drawing Sheet

CPS TRANSFORM CORRELATION RECEIVER AND METHOD

BACKGROUND OF THE INVENTION

This invention relates, in general, to radio navigation receivers, and more specifically, to a rapid acquisition GPS (Global Positioning System) receiver.

Radio navigation systems are used in tracking aircraft, boats, and land vehicles such as trucks and emergency vehicles. To avoid the limitations inherent in navigation systems utilizing terrestrial transmitters, the GPS has been developed and maintained by the U.S. Government. The GPS uses a network of satellites which can be accessed anywhere in the range of the orbiting satellites. An explanation of the operation of the GPS, as well as a history of the receivers designed to operate with the GPS, is found in U.S. Pat. No. 4,785,463 issued Nov. 15, 1988 to Robert V. Janc and Steven C. Jasper, and U.S. Pat. No. 4,701,934 issued Oct. 20, 1987 to Steven C. Jasper. Both patents are assigned to the same assignee as the present invention.

Rapid acquisition of GPS signals is often more important than accuracy of the information received, particularly in an environment where signal dropout due to interference is likely. Current techniques for signal acquisition, such as those described in the above referenced patents, require several seconds for acquisition. A major factor distinguishing GPS receivers, particularly small, low cost receivers requiring less power, is the speed of acquisition of the GPS signals. The faster the acquisition rate with reasonable accuracy, the more competitive the receiver is.

Another feature of a receiver which is necessary to ensure competitiveness in the GPS receiver market is the ability of the receiver to track multiple satellites simultaneously. In an effort to track satellites, GPS receivers to date have incorporated either sequential or parallel layout architectures. Advocates of sequential architecture claim that sequential architecture receivers reduce hardware cost and reduce interchannel biases that exist in the measurement of relative code phase between multiple satellites. Sequential receivers multiplex all the hardware between the various satellites to be tracked, permitting each satellite to be tracked for a fraction of the total time in a multiplexing manner. With the advent of high speed sampling, however, parallel architectures have been developed with significant reductions in cost and improvements in tracking performances. In parallel architectures, IF samples are processed digitally at rates in excess of the received code rates. This permits the processing of multiple channels with additional correlation ASIC processors. The sensitivity to receiver clock errors is greatly reduced. However, even with the increased speed of the digitally processing parallel architecture, all GPS receivers to date require several seconds for signal acquisition.

SUMMARY OF THE INVENTION

Accordingly, it is an object of the present invention to provide a high speed GPS receiver which reduces the code search time, and subsequent code acquisition time, to 30 milliseconds or less.

Another object of the present invention is to provide a high speed GPS receiver which tracks many satellites simultaneously and allows direct pseudorange measurement.

An additional object of the present invention is to provide a high speed GPS receiver which allows synchronous sampling of multiple GPS satellites.

A further object of the present invention is to provide a high speed GPS receiver which performs GPS code tracking.

A method for rapid acquisition of multiple GPS signals builds upon fast Fourier transformation of input GPS signals to simultaneously track multiple satellites and derive psuedorange measurements that are suitable for navigation solution. The method utilizes 2M samples of the reference signal with N samples of the signal set from the satellites (one millisecond of actual data) with a FFT process to directly compute the fractional psuedorange values for four (4) or more satellites. The FFT process is then combined with a process to determine an integer psuedorange. The integer psuedorange is combined with a fractional psuedorange established by the FFT process to define the GPS navigation solution.

The above and other objects, features, and advantages of the present invention will be better understood from the following detailed description taken in conjunction with the accompanying drawings.

DETAILED DESCRIPTION OF THE INVENTION

Code acquisition of Global Positioning System (GPS) signals are routinely performed using a time consuming, time domain correlation technique. For example, the C/A code search method utilized in modern GPS receivers typically requires several seconds for code acquisition.

The present invention reduces the code acquisition time to a search time of under 30 milliseconds, and simplifies the general architecture while allowing simultaneous satellite tracking. To accomplish this, the present invention uses the Discrete Fourier Transform (DFT) as a building block in the design of an advanced GPS receiver. Specifically, the present invention incorporates a modification of DFT known as the Fast Fourier Transform (FFT) which incorporates the Cooley-Tukey algorithm developed in the 1960's. With the advent of advanced computer hardware, the FFT has been used in various applications, many of which involve frequency identification. While the FFT is most often viewed as useful in separating complex signal wave forms into the respective frequency components, a most useful property of the FFT has gone unnoticed in the development of GPS receivers. This property, known as the periodic convolution, generates the transform of the cross correlation function for the received signal and a reference code. The periodic convolution process multiplies the transform of the received signal with the transform of the reference code. Having computed the transform of the cross correlation function, the time domain correlation function can be generated in a single step using the inverse FFT. Since the FFT (and implicitly the inverse FFT) has already been reduced to efficient Very Large Scale Integration (VLSI) hardware, the FFT methodology is easily used for GPS C/A code acquisition and tracking.

The use of FFT in GPS systems is documented in U.S. Pat. No. 4,601,005, issued July 15, 1986, to John Kilvington. However, the U.S. Pat. No. 4,601,005 does not address a key issue important in the actual realization of the use of FFT in GPS. The U.S. Pat. No. 4,601,005 does recognize that the number of samples of the signal set, M, must be correlated with 2M samples from the reference, or overlapping segment in the reference data set. Furthermore, the U.S. Pat. No. 4,601,005 can only track one satellite at a time. This slows target tracking and requires additional circuitry. For simplification of a FFT tracking device, simultaneous parallel tracking of multiple satellites is necessary.

Figure 1:
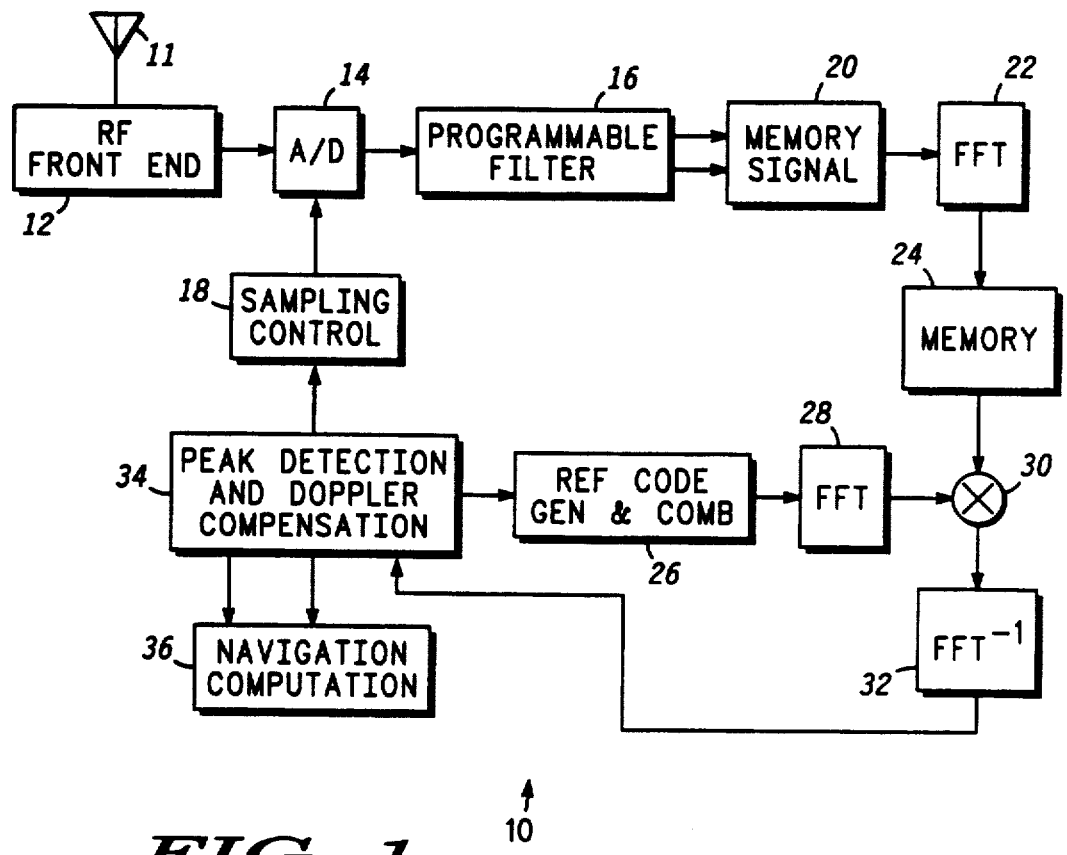
FIG. 1 is a block diagram of a frequency transform correlator according to the present invention.

FIG. 1 illustrates the architecture for a frequency transform correlator 10 which measures psuedorange for periodic spread spectrum signals. Frequency transform correlator 10 comprises an RF front end 12 for down conversion of RF signals received by antenna 11, A/D 14 for converting the analog signals received from front end 12 into digital, and for slightly spreading the received signal, and programmable filter 16. A/D 14 is further coupled to sampling control 18. Sampling control 18 facilitates sampling of the input signal at intervals of 1 microseconds. This allows A/D 14 output of 50 to 100 Mhz. Programmable filter 16 then compresses the samples to a rate of 1.023 Mhz resulting in data samples of 1023 elements (M) of a 2048 element array (2M).

Frequency transform correlator 10 further comprises signal memory 20 where the M elements from programmable filter 16 are stored, signal FFT (fast Fourier transform) 22 which receives the stored M elements and processes the 2M elements using a discrete Fourier transform (preferably fast Fourier transform), and final memory 24 which stores the FFT 2M elements.

A reference code 26 simultaneously retrieves from an internal memory a reference code for each satellite being tracked at a given time, and combines the reference codes into a single signal. The summed signal comprises a total of 2048 elements, or 2M samples, within a 2048 element array. The 2M output is converted in a reference FFT 28 using a discrete Fourier transform.

Figure 2:
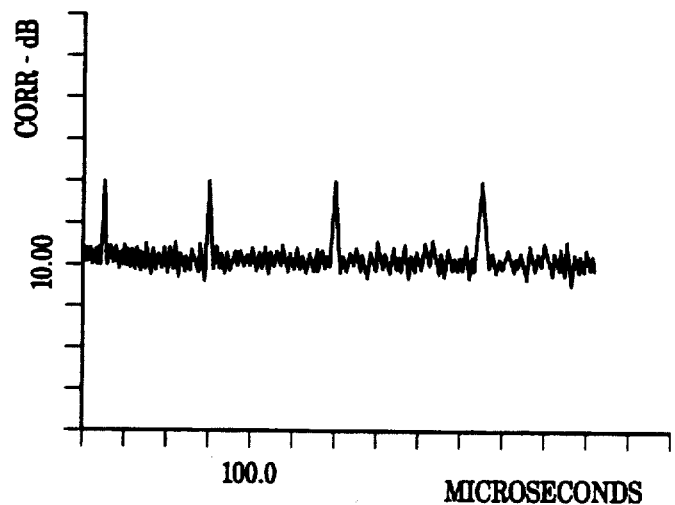
FIG. 2 shows representative test results of the present invention.

The 2M FFT signal from reference FFT 28 is multiplied in multiplier 30 with the 2M FFT signal stored in final memory 24. The product is computed on a point by point basis for the entire 2048 element array. The inverse 2M FFT of the product is generated in FFT$^{-1}$ 32 to output the correlation function between the reference signals and the input RF signal. The correlation function is output to peak detector/Doppler compensator (PD/DC) 34. FIG. 2 shows an example of the correlation function where four (4) peaks have been detected within PD/DC 34 for 4 satellites. As can be seen in FIG. 2, peaks representing a significant M element for each satellite can be obtained in a single signal process using the 2M FFT/FFT$^{-1}$ procedure. Peak detection is performed within PD/DC 34 on the magnitude of the 2048 array, and a phase angle of the carrier signal for each satellite is calculated from the phase angle of the inverse FFT at the peaks.

The psuedorange which is required to calculate the GPS navigation solution is comprised of a fractional psuedorange and an integer psuedorange. The fractional psuedorange measurement for each satellite is determined with a one (1) millisecond ambiguity by performing a simple search of the cross correlation function for the peak and then reporting the address of this peak with respect to a reference. The fractional psuedorange represents a fractional part of a C/A (clear acquisition) code length (C/A code length for GPS is one millisecond in time or approximately 300 kilometers). The integer portion of the psuedorange represents the whole number of milliseconds corresponding to the reference epoch, defined as the time when the satellite signal was transmitted. The integer portion of the psuedorange must be established by resolving the one millisecond ambiguity of the fractional psuedorange.

The one millisecond ambiguity of the fractional psuedorange is resolved by detecting bit transitions from the phase measurements available from each detected correlation peak. At bit transition, these phase measurements will change by 180 degrees. By combining bits into words, recognizing the beginning of the GPS data frame, and decoding navigation data transmitted from the satellites, the time of a bit transition can be established. These parameters define the integer psuedorange.

The fractional psuedorange measurement and the integer psuedorange measurement of PD/DC 34 are output to a navigation computation circuit 36. In circuit 36 the two psuedorange measurements are added together to generate a total psuedorange measurement. The total psuedorange measurement is then used to calculate the navigational position of the object being tracked.

PD/DC 34 also operates to compensate for the Doppler effect on the signal from the satellite. As shown in FIG. 1, PD/DC 34 is coupled to sampling control 18 to control the sampling rate within A/D 14 based upon the Doppler compensation. PD/DC 34 is further coupled to reference code 26 for timing and control.

The discrete Fourier transform (DFT) is defined by the transform pair:

$$\tilde{X}(k) = \sum_n \tilde{x}(n) W_N^{kn}$$

and $$\tilde{x}(n) = \frac{1}{N} \sum_k \tilde{X}(k) W_N^{-kn}$$

where $$W_N = e^{-j2\pi/N}$$

and the summations are over the ranges from 0 to $N-1$.

The DFT of the convolution of two sequences may be computed by multiplying the DFT's of each of the sequences. With high speed A/D conversions at a rate exceeding twice the code bandwidth, such as with GPS systems, the DFT of the received signal can be compute using data from one period of the C/A code (1 millisecond). The DFT contains information on all the GPS signals converted to a frequency. The GPS frequency signals are stored in cache memory for further processing with a transform that is constructed from each of the potential synthesized codes.

For initial acquisition, a Doppler corrected reference code for each satellite to be observed is transformed using DFT. In generating the transform of the reference code, 2M samples are used, where M = 1024 elements (GPS code length of +1). The transform for each code is then computed either off line and stored in cache memory, or as needed in real time just prior to the final multiplication process. The transform of the cross correlation function is computed simply by multiplying the transforms on a point by point basis. The signal transform for those points of the 2048 array left empty by the 1023 FFT M elements from final memory 24 are given the value zero.

Thus there has been provided, in accordance with the present invention, a frequency transform correlator that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A GPS transform correlator comprising:
   first means for receiving a composite of multiple satellite signal inputs to compute a 2M FFT (fast Fourier transform) of said composite of multiple satellite signal inputs, where M is equal to or greater than a number of samples in a code period;
   second means for supplying a reference code having a length of 2M samples for said composite multiple satellite signal inputs;
   third means coupled to said first means to receive said 2M FFT, and coupled to said second means to receive said reference code;
   said third means for multiplying said 2M FFT composite of multiple satellite signal inputs with said reference code to generate a M frequency spectrum of a cross correlation function (CCF);
   fourth means for computing an inverse 2M FFT from said frequency spectrum, said fourth means coupled to said third means;
   fifth means for simultaneously detecting peaks corresponding to each of said composite of multiple satellite signal inputs which define a psuedorange for each of the satellites to permit a GPS navigation solution; and
   said fourth means coupled to said fifth means to supply said inverse 2M FFT to said fifth menas.

2. A GPS transform correlator according to claim 1 wherein said third means comprises a multiplier.

3. A method for rapid acquisition of multiple GPS signals from multiple satellites comprising the steps of:
   computing a 2M FFT of the composite of the multiple GPS signals, where M is equal to or greater than a number of samples in a code period;
   combining in a multiplier said 2M FFT with a reference code having a length of 2M samples for said composite multiple GPS signals;
   computing the inverse 2M FFT of said combined 2M FFT and said reference code;
   defining a fractional (fractional part of a C/A code period) psuedorange of each of the multiple GPS signals from said inverse 2M FFT;
   computing an integer psuedorange for each of the satellites by recognizing phase transitions of said inverse 2M FFT at peaks associated with the corresponding satellites; and
   combining said integer psuedorange and said fractional psuedorange for each of the satellites to form a total psuedorange for each of the satellites and allow computation of a navigation solution.

4. A method according to claim 3 wherein said step of combining said FFT with a reference code comprises the steps of:
   generating a multiple satellite reference signal;
   computing the reference 2M FFT for said multiple satellite reference signal;
   outputting said reference 2M FFT to said multiplier; and
   multiplying said reference 2M FFT with said FFT.

5. A method according to claim 4 wherein said step of generating a multiple satellite reference signal comprises multiplying a Doppler shifted sinusoidal signal with a psuedo noise sequence signal.

6. A GPS transform correlator according to claim 1 wherein said first means comprises a receiver for receiving said composite of multiple satellite signal inputs.

7. A GPS transform correlator according to claim 1 wherein said first means comprises a FFT means for generating said FFT of said composite of multiple satellite signal inputs.

8. A GPS transform correlator according to claim 1 wherein said second means comprises:
   reference means for generating a reference signal, said reference signal comprising a reference for each of said multiple satellite signal inputs;
   FFT means for generating said reference code by computing the FFT of said reference signal;
   said FFT means coupled to said reference means to receive said reference signal; and
   said FFT means coupled to said third means to output said reference code.

9. A GPS transform correlator according to claim 1 wherein the correlator further comprises a sixth means for recognizing phase transitions of said inverse FFT at peaks corresponding to each of said satellites, said sixth means coupled between said fourth and said fifth means.

* * * * *

UNITED STATES PATENT AND TRADEMARK OFFICE
CERTIFICATE OF CORRECTION

PATENT NO. : 4,998,111
DATED : March 5, 1991
INVENTOR(S) : Stephen Chih-Hung Ma et al.

It is certified that error appears in the above-identified patent and that said Letters Patent is hereby corrected as shown below:

On the title page, item [54] and in column 1, line 1:

In the title, delete "CPS" and substitute --GPS--.

Signed and Sealed this

Sixteenth Day of March, 1993

Attest:

STEPHEN G. KUNIN

*Attesting Officer*    *Acting Commissioner of Patents and Trademarks*